US009672294B2

(12) United States Patent
Pilkington

(10) Patent No.: US 9,672,294 B2
(45) Date of Patent: *Jun. 6, 2017

(54) PARTIAL DATA REPORT GENERATION WITH DATA COSTING NOTIFICATION

(71) Applicant: International Business Machines Corporation, Armonk, NY (US)

(72) Inventor: Adam Pilkington, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 448 days.

This patent is subject to a terminal disclaimer.

(21) Appl. No.: 13/915,832

(22) Filed: Jun. 12, 2013

(65) Prior Publication Data

US 2014/0372845 A1    Dec. 18, 2014

(51) Int. Cl.
*G06F 17/00*    (2006.01)
*G06F 17/30*    (2006.01)

(52) U.S. Cl.
CPC .... *G06F 17/3089* (2013.01); *G06F 17/30882* (2013.01); *G06F 17/30887* (2013.01); *G06F 17/30899* (2013.01)

(58) Field of Classification Search
CPC ......... G06F 17/30899; G06F 17/30882; G06F 17/30887
See application file for complete search history.

(56) References Cited

U.S. PATENT DOCUMENTS 6,834,372 B1 * 12/2004 Becker et al. ............. 715/234
7,877,379 B2    1/2011 Waingold et al.
7,966,562 B1 * 6/2011 Brewton ............... G06F 9/4446
                                                        709/219
2003/0074177 A1 * 4/2003 Bowen ................ G06F 17/5022
                                                        703/22
2003/0226102 A1 * 12/2003 Allor ........................ 715/501.1
2005/0080880 A1 * 4/2005 von Tetzchner .. H04M 1/72561
                                                        709/219
2011/0302524 A1    12/2011 Forstall

FOREIGN PATENT DOCUMENTS

WO    WO2012051773 A1    4/2012

OTHER PUBLICATIONS

Weinreich et al., Concepts for improved visualization of Web link attributes, 2000, Elsevier Science B.V., p. 403-416.*

* cited by examiner

*Primary Examiner* — Andrew McIntosh
(74) *Attorney, Agent, or Firm* — Steven M. Greenberg, Esq.; CRGO Law

(57) ABSTRACT

Embodiments of the present invention provide a method, system and computer program product for partial data report generation with data costing notification. In an embodiment of the invention, a method for partial data report generation with data costing notification is provided. The method includes registering a call back for an operation specified by a plug in to a diagnostic tool. The method also includes responding to invoking the plug in by generating markup with data provided by different operations of the plug in, and also with at least one hyperlink in lieu of data known to be temporally costly, the hyperlink comprising a textual indication of a temporal cost of retrieving the data known to be temporally costly and an address of an operation programmed to retrieve the data.

10 Claims, 2 Drawing Sheets

PARTIAL DATA REPORT GENERATION WITH DATA COSTING NOTIFICATION

BACKGROUND OF THE INVENTION

Field of the Invention

The present invention relates to data set analysis and more particularly to report generation in data set analysis.

Description of the Related Art

Data storage and analysis has remained a core competency of industrial computing for many decades. Data storage refers to the collection of data and the storage thereof in a data store such as a database. Data analysis, in turn, refers to the reduction of data according to interrelationships between the data, filtered commonalities amongst the data, and conclusions able to be drawn based upon either or both of the interrelationships and filtered commonalities. The most common manner in which to present the results of data analysis is within a report, whether printed or merely electronically displayed in a display of a computing terminal.

When performing data analysis upon large data sets such as a "core file", some operations are known to consume less memory and processing resources than others that are deemed resource expensive. Conversely, the same resource expensive operations performed during data analysis upon a small data set may not be so costly. Notwithstanding, when designing a report for an end user one often prefers to consolidate the results of both cheap and expensive data analyses within a a single display. Consequently, the consolidated display can be only be displayed when the most expensive operation has completed. To the extent that the display is a Web page returned over a computer communications network for rendering in a content browser, the Web page itself cannot be generated and transmitted until the last data element has been provided, irrespective of the expense in acquiring the last data element. Notwithstanding, at the time the report is requested by the end user, the end user lacks a priori knowledge as to the likelihood that necessity to incorporate "expensive" data within the report and thus lacks an awareness as to how long a delay is expected to receive the requested report.

There are number of solutions to this problem. In one solution, the report is split between a portion including inexpensively acquired data elements and a portion including the expensive data elements. The first portion can be delivered post haste while the second portion can be delayed in delivery. Notwithstanding, the end user still must wait for an unknown amount of time whilst the expensive data is acquired. In a second solution, the data analysis can be performed prior to the end user requesting a report. However, to do so still consumes substantial processing resources of the data processing system without certainty that an end user seeks this report. Thus, the second solution can on occasion be wasteful.

BRIEF SUMMARY OF THE INVENTION

Embodiments of the present invention address deficiencies of the art in respect to data analysis and provide a novel and non-obvious method, system and computer program product for partial data report generation with data costing notification. In an embodiment of the invention, a method for partial data report generation with data costing notification is provided. The method includes registering a call back for an operation specified by a plug in to an analysis tool such as a diagnostic tool. The method also includes responding to invoking the plug in by generating a display, for example a display defined by markup, with data provided by different operations of the plug in, and also with at least one selectable control, such as a button or hyperlink, in lieu of data known to be temporally costly, the control displaying a textual indication of a temporal cost of retrieving the data known to be temporally costly and being linked to an operation programmed to retrieve the data.

In another embodiment of the invention, a computer data processing system is configured for partial data report generation with data costing notification. The system includes a host computing system that includes at least one computer each computer including memory and at least one processor. The system also includes an analysis tool such as a diagnostic tool executing in the memory of the host computing system and a plug in to the analysis tool. The plug in includes program code enabled to register a call back for an operation specified by a plug in to the analysis tool and to respond to invoking the plug in by generating a display with data provided by different operations of the plug in, and also with at least one selectable control in lieu of data known to be temporally costly, the control displaying a textual indication of a temporal cost of retrieving the data known to be temporally costly and being linked to an operation programmed to retrieve the data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for partial data report generation with data costing notification. In accordance with an embodiment of the invention, a callback can be registered with an analysis application such as a diagnostic server, in association with an operation specified in source code reporting data within a report. In response to the registration, upon execution of the source code a user interface control such as a button or hyperlink can be placed within a portion of the report corresponding to the operation. The control can indicate an expected duration of execution in order to retrieve the data implicated by the operation. The control further can be configured to respond to its selection by directing the execution of the operation to retrieve the implicated data. In this way, the report can be generated and provided to a requesting end user quickly and efficiently without prejudicing the delivery of the report for data requiring an extensive period of time for retrieval.

Figure 1:
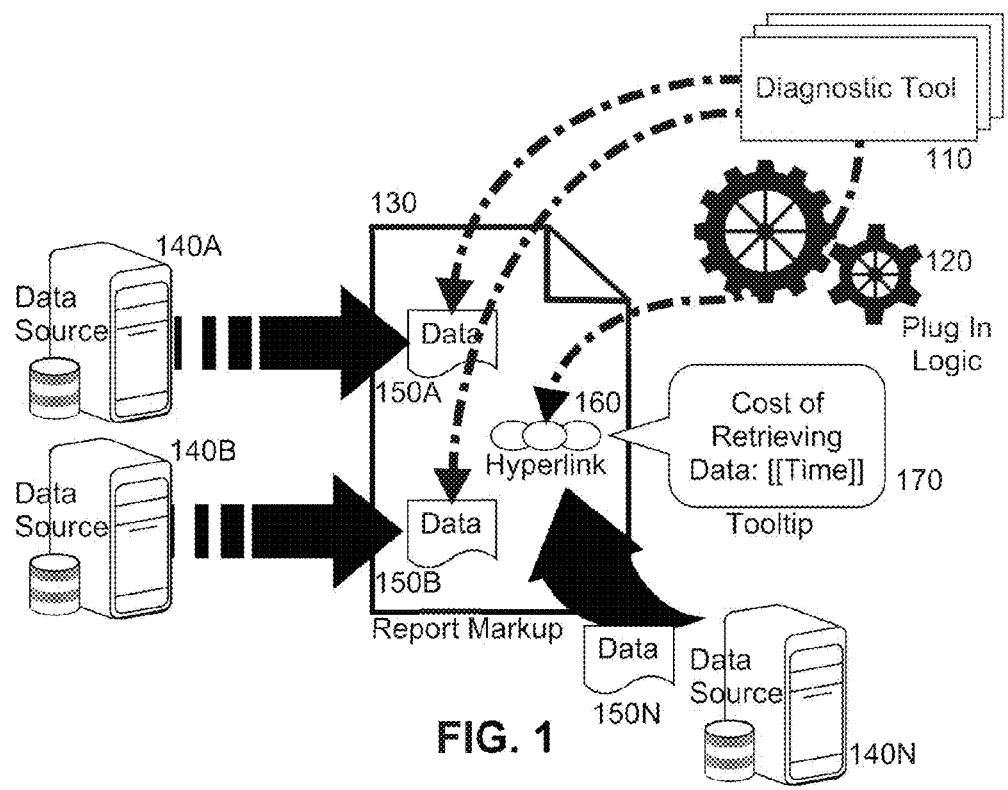
FIG. 1 is a pictorial illustration of a process for partial data report generation with data costing notification.

In further illustration, FIG. 1 is a pictorial illustration of a process for partial data report generation with data costing notification. As shown in FIG. 1, an analysis application such as diagnostic tool 110 can receive a request to invoke plug in logic 120 to produce a report 130. The report 130 can be an electronically displayable report and can include data 150A, 150B, 150N acquired from corresponding data sources 140A, 140B, 140N. However, to the extent that data 150N is determined to be temporally costly to acquire, in place of the data 150N, the plug in logic 120 can include in the report 130 a selectable control such as a hyperlink 160 referencing an operations disposed in the diagnostic tool 110 that has been configured in response to its selection to retrieve the data 150N from the data source 140N irrespective of the temporal cost of retrieving the data 150N. A tool tip 170 also can be included with the hyperlink 160. The tool tip 170 can include a textual explanation of the temporal cost. In this way, the diagnostic tool 110 can respond to the invocation of the plug in logic 120 by rapidly assembling and returning for display the report 130 without delaying such assembly while awaiting the retrieval of the data 150N due to the temporal cost of the retrieval of the data 150N.

Figure 2:
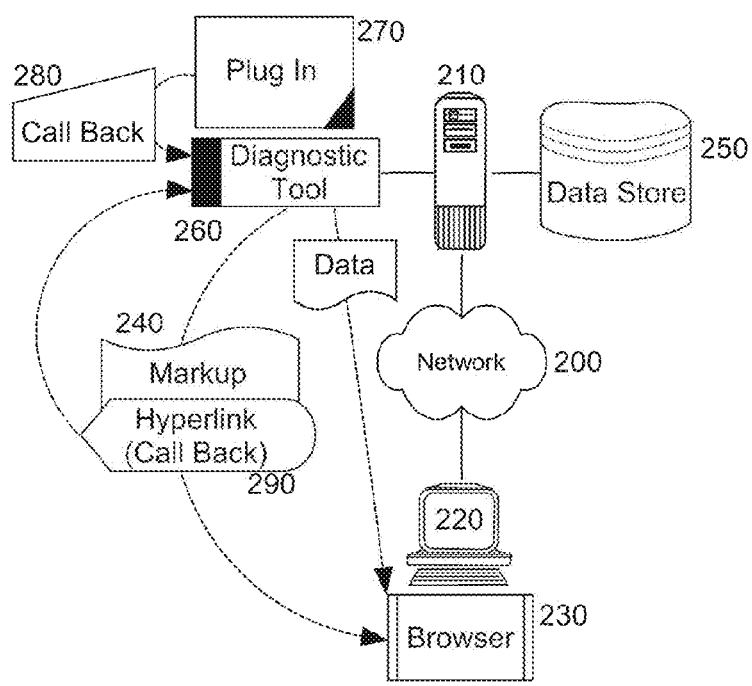
FIG. 2 is a schematic illustration of a computer data processing system configured for partial data report generation with data costing notification; and, FIG. 3 is a flow chart illustrating a process for partial data report generation with data costing notification.

The process generally described in connection with FIG. 1 can be implemented within a computer data processing system. In yet further illustration, FIG. 2 schematically shows a computer data processing system configured for partial data report generation with data costing notification. The system can include a host computing system 210 that can include one or more computers each with memory and at least one processor. The host computing system 210 can be coupled to a client computer 220 over a computer communications network 200. The client computer 220 can support the operation of a content browser 230 configured to render and display Web pages provided by the host computing system 210.

Of note, an analysis tool such as a diagnostic tool 260 can execute in the memory of the host computing system 210. The diagnostic tool 260 can be configured to process requests to acquire and reduce data from one or more data stores 250 accessible to the host computing system 210. The diagnostic tool 260 further can be configured to generate a report within markup 240 of a Web page incorporating data retrieved and reduced from one or more of the data stores 250. The markup 240 of the Web page in turn can be rendered and displayed in the browser 230. Even yet further, the diagnostic tool 260 can be configured for interoperation with one or more plug ins 270. Each of the plug ins 270 can include program code enabled to perform different operations for collecting data from the data stores 250.

At least one of the plug ins 270 can additionally include program code enabled to register a call back 280 to the diagnostic tool 260 to perform an operation for collecting particular data determined to be temporally costly. In particular, the call back 280 can be associated with a numerical value for pre-storage in the diagnostic tool 260 that indicates the operation determined to be temporally costly and the temporal cost. The program code additionally can be enabled to direct the diagnostic tool 260 to incorporate into the markup 240 a hyperlink 290 to the callback 280 in lieu of the particular data determined to be temporally costly. Even yet further, the program code can incorporate into the hyperlink 290 a tool tip indicating the temporal cost of performing the operation for collecting the particular data.

Figure 3:
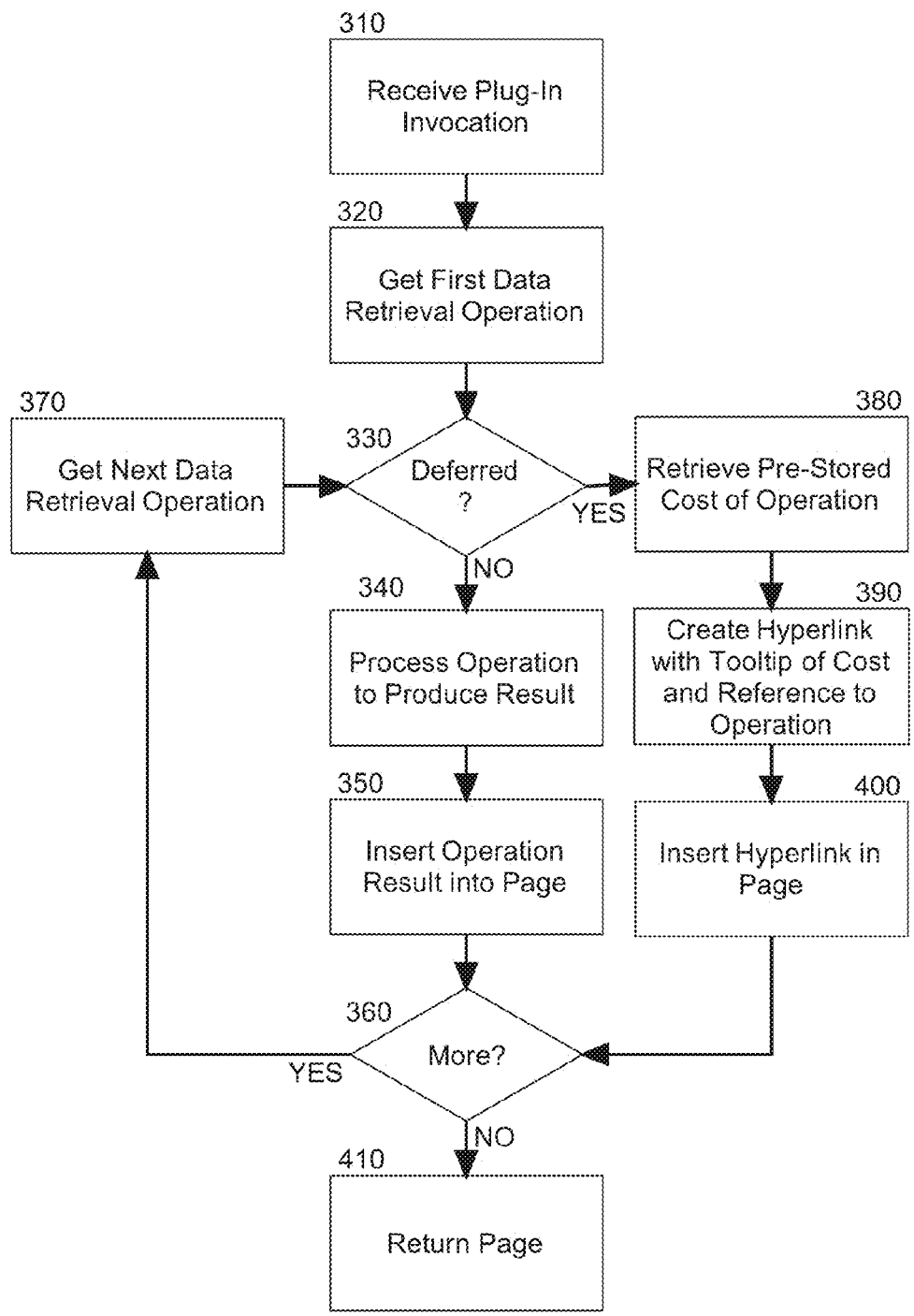

In even yet further illustration of the operation of the plug in 270 to the diagnostic tool 260, FIG. 3 is a flow chart illustrating a process for partial data report generation with data costing notification. The process begins in block 310 with the receipt of a request to invoke the logic of a plug in. The invocation of the plug in can result in the processing of one or more operations specified by the plug in. In this regard, in block 320, a first data retrieval operation can be identified. In decision block 330 it can be determined whether or not the identified operation has been determined to be deferred due to its known temporal cost. If not, in block 340 the operation can be executed to produce a data result and in block 350 the result of the operation can be included in markup defining a report. Thereafter, in decision block 360 if additional operations specified in the plug-in remain to be processed, in block 370 a next operation can be identified in the plug in and the process can repeat in decision block 330.

In decision block 330, if the identified operation has been determined to be deferred due to its known temporal cost, in block 380 a pre-stored cost of operation can be retrieved and in block 390, a hyperlink can be created that references the operation and includes a tool tip indicating the temporal cost of the operation. The hyperlink as an option additionally can indicate a priority of the operation so as to provoke the use of additional resources when asynchronously executed upon activation of the hyperlink. Subsequently, in block 400 the hyperlink can be included in the markup in lieu of a data result for the operation. However, the activation of the hyperlink can result in the operation being invoked for asynchronous execution, and the data result produced by the asynchronous operation being placed in the markup in lieu of the hyperlink. Finally, in decision block 360 if additional operations specified in the plug-in do not remain to be processed, the process can end in block 410.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A computer data processing system configured for partial data report generation with data costing notification, the system comprising:
   a host computing system comprising at least one computer each computer comprising memory and at least one processor;
   an analysis tool executing in the memory of the host computing system; and,
   a plug in to the analysis tool communicatively linked to the analysis tool, the plug in comprising program code enabled to process requests to acquire and reduce data from one or more data stores accessible to the host computing system, to register with the analysis tool a call back for a plurality of data retrieval operation specified by the plug in to retrieve data corresponding to each of the data retrieval operations from one or more of the data stores the plug in reporting the retrieved data within a report and to respond to invoking the plug in by determining for each data retrieval operation whether the data retrieval operation should be deferred based on a predetermined temporal cost of retrieving the data corresponding to the data retrieval operation, generating the report with the data retrieved by data retrieval operations determined not to be deferred and directing the analysis tool by the plug-in to insert within the report at least one selectable user interface control that references the call back that is registered with the analysis tool and includes a textual indication of the temporal cost of retrieving the data known to be temporally costly in place of the data when the data retrieval operations are determined to be deferred.

2. The system of claim 1, wherein the textual indication is provided within a tool tip of the hyperlink.

3. The system of claim 1, wherein the call back is registered in connection with a numerical value that specifies the data retrieval operation programmed to retrieve the corresponding data and the temporal cost.

4. The system of claim 1, wherein the at least one hyperlink also indicates a priority of the data known to be temporally costly.

5. A computer program product for partial data report generation with data costing notification, the computer program product comprising:

a non-transitory computer readable storage medium having computer readable program code embodied therewith, the computer readable program code comprising:

computer useable program code for communicatively linking a plug-in to an analysis tool executing in memory of a host computing system, the plug-in processing requests to acquire and reduce data from one or more data stores accessible to the host computing system;

computer readable program code for registering with the analysis tool by the plug-in to retrieve data corresponding to each of the data retrieval operations from one or more data stores the plug-in reporting the retrieved data within a report; and, computer readable program code for responding to an invocation of the plug in by determining for each data retrieval operation whether the data retrieval operation should be deferred based on a predetermined temporal cost of retrieving the data corresponding to the data retrieval operation, generating the report with data retrieved by data retrieval operations determined not to be deferred and directing the analysis too by the plug-in to insert with the report at least one selectable user interface control that references the call back that is registered with the analysis tool and includes a textual indication of the temporal cost of retrieving the data known to be temporally costly in place of the data when the data retrieval operations are determined to be deferred.

6. The computer program product of claim 5, wherein the textual indication is provided within a tool tip of the at least one selectable user interface control.

7. The computer readable program code of claim 5, wherein the call back is registered in connection with a numerical value that specifies the data retrieval operation programmed to retrieve the corresponding data and the temporal cost.

8. The computer readable program code of claim 5, wherein the at least one selectable user interface control also indicates a priority of the data known to be temporally costly.

9. The computer program of claim 5, wherein the at least one selectable user interface control is a hyperlink.

10. The computer program product of claim 5, wherein the at least one selectable user interface control is a button.

\* \* \* \* \*